(No Model.)

G. MEYER.
REAMING SAW.

No. 281,105. Patented July 10, 1883.

WITNESSES:
Otto Hufeland
William Miller

INVENTOR
George Meyer
BY Van Santvoord & Hauff
ATTORNEYS

UNITED STATES PATENT OFFICE.

GEORGE MEYER, OF NEW YORK, N. Y.

REAMING-SAW.

SPECIFICATION forming part of Letters Patent No. 281,105, dated July 10, 1883.

Application filed November 10, 1882. (No model.)

*To all whom it may concern:*

Be it known that I, GEORGE MEYER, a citizen of the United States, residing at New York, in the county and State of New York, have invented new and useful Improvements in Reaming-Saws, of which the following is a specification.

This invention relates to saws for reaming or cutting angular grooves into wood, so as to allow it to be bent, as the rims or flaps of piano-fortes.

Prior to my invention a saw has been made for this purpose with tapering teeth, which are beveled on both sides of the blade toward the point; but considerable difficulty is experienced in getting such teeth true or equal in length to each other on the cutting-edge, on account of the double bevel, and hence the saw is liable to cut the grooves to an uneven depth at different points, which interferes with the proper bending of the wood.

My invention is designed to overcome this disadvantage; and to this end it consists in a saw made with tapering teeth, which are beveled on one side of the blade only, they being left flush with the blade on the other side.

Figure 1:
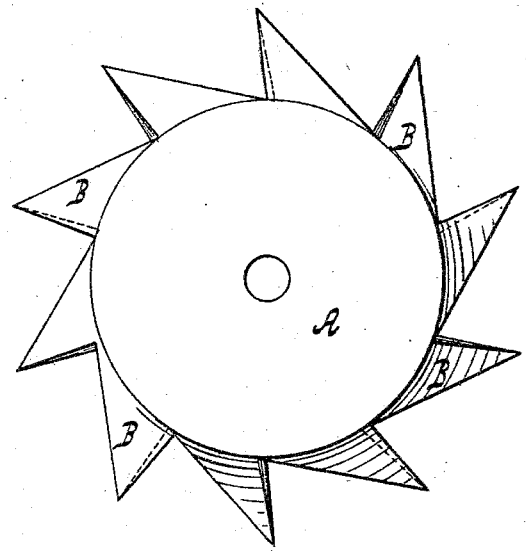
Figure 2:

This invention is illustrated in the accompanying drawings, in which Figure 1 represents a side view, and Fig. 2 a cross-section. Similar letters indicate corresponding parts.

The letter A designates the saw-blade, and B its tapering teeth, the latter being beveled toward the point on one side of the blade, leaving the same flush or coincident with the blade on the opposite side, so that the groove that may be cut with the saw is vertical on one side and inclined on the other. Said teeth B thus need be gaged only on one side, and can readily be filed up to the edge or point without removing such edge, due to the plain sides, so that the least labor is involved in sharpening the teeth, while no difficulty is had in getting and preserving the same true or equal in length to each other. The cutting-edges of the teeth are alternately on opposite sides of the blade, as heretofore.

I am aware that circular saws have been made constructed of several plates bolted together, and having segmental toothed cutting-plates having a partial bevel in cross-section; but such a construction forms no part of my invention.

What I claim as new, and desire to secure by Letters Patent, is—

A reaming-saw constructed from a single plate, and having cutting-teeth beveled upon one side from their base to their point, the opposite faces of said teeth being in the same plane with the surface of the saw-blade, substantially as described.

In testimony whereof I have hereunto set my hand and seal in the presence of two subscribing witnesses.

GEORGE MEYER. [L. S.]

Witnesses:
W. HAUFF,
CHAS. WAHLERS.